UNITED STATES PATENT OFFICE.

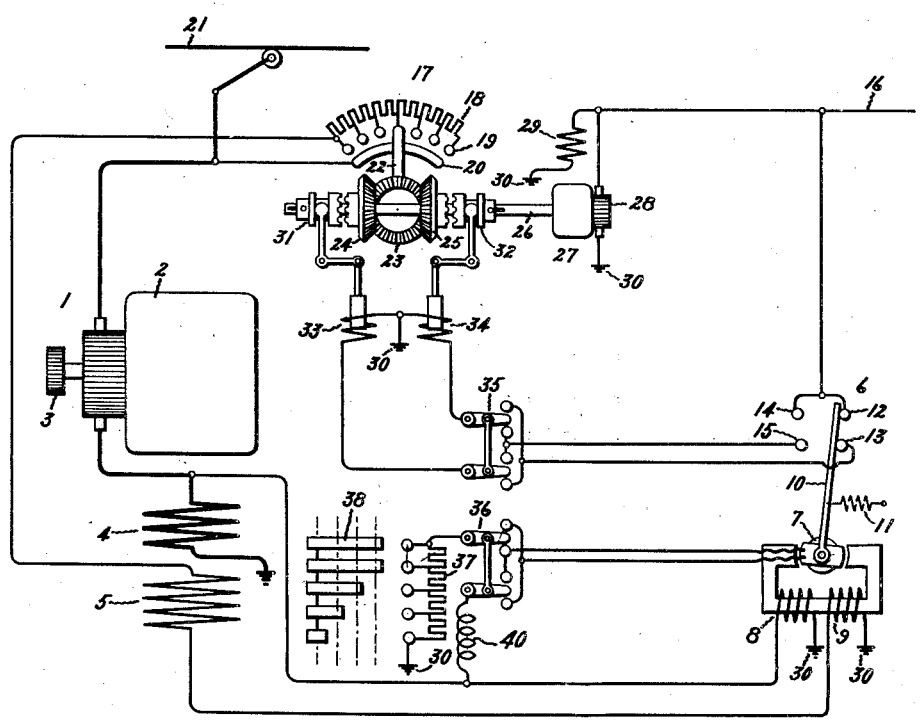

CLINTON J. AXTELL, OF SCHENECTADY, NEW YORK, ASSIGNOR TO GENERAL ELECTRIC COMPANY, A CORPORATION OF NEW YORK.

ELECTRICAL SYSTEM OF POWER TRANSMISSION AND REGENERATIVE BRAKING.

1,380,941. Specification of Letters Patent. Patented June 7, 1921.

Application filed February 4, 1918. Serial No. 215,280.

*To all whom it may concern:*

Be it known that I, CLINTON J. AXTELL, a citizen of the United States, residing at Schenectady, in the county of Schenectady, State of New York, have invented certain new and useful Improvements in Electrical Systems of Power Transmission and Regenerative Braking, of which the following is a specification.

My invention relates to electrical systems of power transmission and regenerative braking, and particularly to electrical systems of power transmission and regenerative braking comprising a dynamo-electric machine which is connected to operate either as a motor to drive, or as a generator to brake, a load, such as a traction or a similar load.

My invention has for its principal object the provision, in systems of the kind referred to, of means whereby the braking torque developed by the dynamo-electric machine will, during its generator operation, be maintained approximately constant notwithstanding considerable variation in the voltage of the supply circuit and in the speed of the dynamo-electric machine. My invention, furthermore, has for an object the provision of means whereby the driving torque developed by the dynamo-electric machine will, during its motor operation, also be maintained approximately constant notwithstanding considerable variation in the voltage of the supply circuit and in the speed of the dynamo-electric machine. Other objects of my invention will appear as this specification progresses.

In accordance with my invention I provide, in a system of the kind referred to, automatic means for maintaining the braking torque developed by the dynamo-electric machine, when it operates as a generator, approximately constant and for maintaining the driving torque developed by the dynamo-electric machine, when it operates as a motor, approximately constant. This automatic means comprises a torque relay which is designed and connected to the circuits of the dynamo-electric machine in such a way that the torque developed therein is proportional to the torque of the dynamo-electric machine. The torque relay controls mechanism for varying the excitation of the dynamo-electric machine.

For a better understanding of my invention, reference should be made to the accompanying drawing, the single figure of which illustrates diagrammatically a system embodying one form of my invention. Referring to the drawing, 1 represents a dynamo-electric machine having an armature 2, which may be connected to the axle of a vehicle, or other load, by means of a gear 3 and other mechanism (not shown), a winding 4, and a shunt field winding 5. 6 represents a torque relay comprising relatively movable members, one of which carries a movable winding 7 and another of which carries the stationary windings 8 and 9. The movable winding 7 is fixed to the contact blade 10, which is biased to move in a clockwise direction by means of the spring 11. The contact blade 10 is adapted to engage with the stationary contacts 12 and 13 or with the stationary contacts 14 and 15. The stationary contacts 12 and 14 are electrically connected to the conductor 16 which is connected to a source of current supply (not shown). 17 represents a motor operated rheostat comprising a resistance 18, to spaced points on which are connected the contacts 19, a stationary contact 20 which is connected to conductor 21, and a movable contact member 22, which engages contacts 19 and 20. The movable contact member 22 is connected to the bevel gear 23, which meshes with and is operated by the bevel gears 24 and 25 which are mounted to freely rotate on a shaft 26. The shaft 26 is connected to be driven by the motor 27 comprising an armature 28 and a field winding 29 which are connected in multiple between the conductor 16 and ground 30. The conductor 16 and ground 30 constitute a current supply circuit for the control apparatus. Clutches 31 and 32 are provided for clutching either the bevel gear 24 or the bevel gear 25 to the shaft 26. The clutches 31 and 32 are adapted to be operated by electromagnets 33 and 34, respectively. The energization of the operating windings of the electromagnets 33 and 34 is controlled by the torque relay 6 through the engagement of its movable contact blade 10 either with the stationary contacts 12 and 13 or 14 and 15. The operating winding of the electromagnet 33 is connected between ground 30 and either the stationary contact 13 or the stationary contact 15 by means of the lower blade of the switch 35. Similarly the operating winding of the electromagnet 34 is connected between ground 30 and either the stationary contact 15 or the stationary contact 13 by means of the upper blade of the switch 35. The movable winding 7 of the torque relay 6 is adapted to be connected, in series with the resistance 37, across the series field winding 4 by means of the double-pole double-throw switch 36 which is adapted to reverse the connections thereof. The switches 35 and 36 may, if desired, be connected so as to be operated simultaneously. The stationary winding 8 is also connected across the series field winding 4. The stationary winding 9 is connected, in series with the shunt field winding 5 of the dynamo-electric machine 1 and the motor operated rheostat 17, between the conductor 21 and ground 30. The conductor 21 and ground 30 constitute the main power supply circuit, the voltage upon which is variable. The resistance 37 may be rendered partially or wholly ineffective by means of the controller 38 which is adapted to short-circuit a portion or all thereof. A reactance 40 is connected in series with the winding 7 of the torque relay 6 in order that the circuit, including the winding 7, which is connected in shunt to the series field winding 4 may have the same inductance as the series field winding 4. The current in the winding 7 is, therefore, always proportional to the current in the series field winding 4.

The operation of my invention, as at present understood, is as follows:

Assume the dynamo-electric machine 1 to be operating as a cumulative compound motor, the switches 35 and 36 to be thrown to their lower positions, and the controller 38 to occupy a certain position. The movable winding 7, the stationary winding 8, and the stationary winding 9 of the torque relay 6 will then be traversed by currents having values proportional respectively to the currents traversing the armature 2, the series field winding 4, and the shunt field winding 5 of the dynamo-electric machine 1. The stationary winding 8 is arranged to act cumulatively with respect to the stationary winding 9 when the dynamo-electric machine 1 operates as a motor. The torque relay 6 will develop a torque tending to move the contact blade 10 in a counter-clockwise direction. This torque, by reason of the design of the relay and the arrangement of the windings thereof, will be approximately proportional at all times to the torque developed by said dynamo-electric machine. When the motoring torque developed by the dynamo-electric machine 1 has a predetermined value, the torque developed by the torque relay 6 will be such as to maintain the contact blade 10 in midposition, in which position it engages neither the contacts 12 and 13 nor the contacts 14 and 15. When, however, the motoring torque developed by the dynamo-electric machine 1 exceeds such predetermined value, the torque relay 6 will cause the contact blade 10 to move into engagement with the contacts 14 and 15 thereby effecting the energization of the electromagnet 34 and the operation of the clutch 32, whereupon the contact member 22 will be rotated in a counter-clockwise direction by the motor 27, which during the normal operation of the system is in constant operation, to render ineffective portions of the resistance 18 in series with the shunt field winding 5. The current in the shunt field winding 5 will thereupon increase causing a higher counter-electromotive force to be generated by the dynamo-electric machine and thereby causing a reduction of the current in the motor armature. As is well understood, provided the magnetic circuits of the machine are not saturated, a small change in the field current of the machine will produce a considerably larger variation of the armature current, and the motoring torque of the dynamo-electric machine 1 will decrease, since the motor torque is a function of the product of the current in the motor field and the motor armature. This reduction in motoring torque will be disproportionate to the change in the field winding current. When, by reason of the continued movement of the contact member 22, the motoring torque of the dynamo-electric machine 1 is reduced to said predetermined value, the contact blade 10 will be returned to mid-position. Upon the disengagement of the contact blade 10 from the stationary contacts 14 and 15, the electromagnet 34 is deënergized and the clutch 32 released so that the movement of the movable contact member 22 ceases. If the motoring torque developed by the dynamo-electric machine 1 decreases below said predetermined value, the torque developed in the torque relay 6 will no longer be sufficient to balance or overcome the action of the spring 11 and the contact blade 10 will be moved into engagement with the stationary contacts 12 and 13, thereby effecting the energization of the electromagnet 33 and the operation of the clutch 31, whereupon the contact member 22 will be rotated in a clockwise direction by the motor 27 to increase the resistance 18 in series with the shunt field winding 5. The current in the shunt field winding 5 will thereupon decrease causing the motoring torque of the dynamo-electric machine 1 to increase, and this increase will be disproportionate to the change of the value of current in the shunt field winding 5. A decrease in the current in the shunt field winding will cause a proportionately larger decrease in the armature current, and since the motoring torque is a function of the product of the field and armature currents, the torque produced by the machine will be increased disproportionately to the change in the field winding current. When, by reason of the continued movement of the contact member 22, the motoring torque of the dynamo-electric machine 1 is increased to said predetermined value, the contact blade 10 will be returned to the position illustrated. Upon the disengagement of the contact blade 10 from the stationary contacts 12 and 13, the electromagnet 33 is deënergized and the clutch 31 released so that the movement of the movable contact member 22 ceases.

The torque relay 6 and the motor operated rheostat 17, therefore, operate to maintain the motoring torque, developed by the dynamo-electric machine 1, approximately constant at said predetermined value. By altering the position of the controller 38, thereby varying the effective portion of the resistance 37, the value at which the motoring torque is maintained may be varied.

Now assume the dynamo-electric machine 1 to be operating as a differential compound generator, the switches 35 and 36 to be thrown to their upper positions, and the controller 38 to occupy a certain position. The movable winding 7, the stationary winding 8, and the stationary winding 9 of the torque relay 6 will be traversed by currents having values proportional respectively to the currents traversing the armature 2, the series field winding 4, and the shunt field winding 5 of the dynamo-electric machine 1. The stationary winding 8 acts differentially with respect to the stationary winding 9 when the dynamo-electric machine 1 operates as a generator. Throwing the switch 36 from its lower to its upper position reverses the connections of the movable winding 7, and, consequently, the direction of the current in the winding 7 is the same during the generator operation of the dynamo-electric machine 1 with the switch in the upper position as during the motoring operation of the dynamo-electric machine 1 with the switch 36 in its lower position. The torque relay 6 develops a torque tending to move the contact blade 10 in a counter-clockwise direction. This torque, by reason of the design of the relay and the arrangement of the windings thereof, will be approximately proportional at all times to the braking torque developed in the dynamo-electric machine 1. When the braking torque developed by the dynamo-electric machine 1 has a predetermined value, the torque developed by the torque relay 6 will be such as to maintain the contact blade 10 in mid-position in which it engages neither the contacts 12 and 13 nor the contacts 14 and 15. When, however, the braking torque developed by the dynamo-electric machine 1 exceeds such predetermined value, the torque relay 6 will cause the contact blade 10 to move into engagement with the contacts 14 and 15, thereby effecting the energization of the electromagnet 33 and the operation of the clutch 31, whereupon the contact member 22 is rotated in a clockwise direction by the motor 27 to increase the resistance 18 in series with the shunt field winding 5. The current in the shunt field winding 5 will thereupon decrease causing the braking torque developed by the dynamo-electric machine 1 to decrease. When, by reason of the continued movement of the contact member 22, the braking torque developed by the dynamo-electric machine 1 is decreased to said predetermined value, the contact blade 10 will be returned to mid-position. Upon the disengagement of the contact blade 10 from the stationary contacts 14 and 15, the electro-magnet 33 is deënergized and the clutch 31 released so that the movement of the movable contact member 22 ceases. If the braking torque developed by the dynamo-electric machine 1 decrease below said predetermined value, the torque developed in the torque relay 6 will no longer be sufficient to balance or overcome the action of the spring 11 and the contact blade 10 will be moved into engagement with the stationary contacts 12 and 13, thereby effecting the energization of the electromagnet 34 and the operation of the clutch 32, whereupon the contact member 22 will be rotated in a counter-clockwise direction by the motor 27 to decrease the resistance 18 in series with the shunt field winding 5. The current in the shunt field winding 5 will thereupon increase, causing the braking torque of the dynamo-electric machine 1 to increase. When, by reason of the continued movement of the contact member 22, the braking torque of the dynamo-electric machine 1 is increased to said predetermined value the contact blade 10 will return to mid-position. Upon the disengagement of the blade 10 from the stationary contacts 12 and 13, the electromagnet 33 is deënergized and the clutch 31 released so that the movement of the movable contact member 22 ceases. The torque relay 6 and motor operated rheostat 17 thus operate to maintain the braking torque developed by the dynamo-electric machine 1 approximately constant at said predetermined value. By altering the position of the controller 38, thereby varying the portion of the resistance 37 effective, the value at which the braking torque is maintained may be varied.

It will be manifest that the series field winding 4 which acts cumulatively during the motor operation of the dynamo-electric machine 1 and differentially during the generator operation, will function to prevent objectionable rushes of current due to sudden fluctuations in the voltage of the supply circuit and that the torque relay 6 and the motor operated rheostat 17 will function to maintain the motoring torque and the braking torque of the dynamo-electric machine 1 approximately constant, within the limits for which the system is designed, notwithstanding variations in the voltage of the supply crcuit and notwithstanding variations in the speed of the dynamo-electric machine 1.

While my invention is illustrated as embodied in a system having but one main dynamo-electric machine, it is manifest that it may be applied to systems having a plurality of main dynamo-electric machines. Furthermore, I conceive that various modifications of my invention may be made and I accordingly do not desire to be limited to the exact arrangement shown but seek to cover in the appended claims all such modifications and arrangements as fall within the scope and spirit of my invention.

What I claim as new and desire to secure by Letters Patent of the United States, is:—

1. The combination with a load, of a dynamo-electric machine connected to operate as a motor to drive said load or as a generator to brake said load, and a controller operated responsively to the torque developed by the machine for maintaining the driving torque, developed by the machine when it operates as a motor, and the braking torque, developed by the machine when it operates as a generator, approximately constant.

2. The combination with a dynamo-electric machine provided with a field winding, of means for controlling the excitation of said field winding to maintain the torque developed by said dynamo-electric machine approximately constant, said means comprising a torque relay connected and designed to develop a torque approximately proportional to the torque developed by said dynamo-electric machine, and means for varying the torque of the relay to vary the value of torque of the dynamo electric-machine which is to be maintained approximately constant.

3. The combination with a dynamo-electric machine provided with a field winding, of means for controlling the excitation of said field winding to maintain the torque developed by said dynamo-electric machine approximately constant, said means comprising a torque relay connected and designed to develop a torque approximately proportional to the torque developed by said dynamo-electric machine, and means for varying the proportionality between the torque developed by said dynamo-electric machine and said torque relay and thereby varying the value at which the torque of said dynamo-electric machine is maintained approximately constant.

4. The combination with a dynamo-electric machine provided with an armature and a field winding, of means for controlling the excitation of said field winding and hence the torque developed by said dynamo-electric machine, said means comprising a torque relay having relatively movable windings, one of which is energized in proportion to the current traversing said field winding and another of which is energized in proportion to the current traversing said armature, and means for varying the proportionality between the energization of said last mentioned winding and the current traversing said armature.

5. The combination with a dynamo-electric machine provided with an armature, a shunt field winding and a series field winding, of means for controlling the excitation of said shunt field winding and hence the torque of said dynamo-electric machine, said means comprising a torque relay having relatively movable members, one of which carries a winding which is energized in proportion to the current traversing said armature and another of which carries windings which are energized in proportion to the currents traversing said shunt and series field windings respectively.

6. The combination with a load, of a dynamo-electric machine provided with an armature, a shunt field winding and a series field winding and connected to control said load, means for controlling the excitation of said shunt field winding to maintain the torque developed by said dynamo-electric machine approximately constant, said means comprising a torque relay having relatively movable members, one of which carries a winding which is energized in proportion to the current traversing said armature and another of which carries windings which are energized in proportion to the currents traversing said shunt and series field windings respectively, and means for varying the proportionality between the energization of the winding carried by the first mentioned member and the current traversing said armature and thereby varying the value at which the torque of said dynamo-electric machine is maintained approximately constant.

7. The combination with a load, of a dynamo-electric machine provided with an armature, a shunt field winding and a series field winding and connected to operate as a cumulative compound motor to drive said load or as a differential compound generator to brake said load and means for controlling the excitation of said shunt field winding to maintain the driving and braking torques developed by said dynamo electric machine approximately constant, said means comprising relatively movable members, one of which carries a winding which is energized in proportion to the current traversing said armature and another of which carries windings which are energized in proportion to the current traversing said shunt and series field windings respectively, the windings carried by said second member being arranged to act cumulatively with respect to each other during the motor operation of said dynamo-electric machine and to act differentially with respect to each other during the generator operation of said dynamo-electric machine.

8. The combination with a load, of a dynamo-electric machine provided with an armature, a shunt field winding and a series field winding and connected to operate as a cumulative compound motor to drive said load or as a differential compound generator to brake said load, means for controlling the excitation of said shunt field winding to maintain the driving and braking torques developed by said dynamo-electric machine approximately constant, said means comprising relatively movable members, one of which carries a winding which is energized in proportion to the current traversing said armature and another of which carries windings which are energized in proportion to the current traversing said shunt and series field windings respectively, the windings carried by said second member being arranged to act cumulatively with respect to each other during the motor operation of said dynamo-electric machine and to act differentially with respect to each other during the generator operation of said dynamo-electric machine, and means for varying the proportionality between the energization of the winding carried by the first named member and the current traversing said armature and thereby varying the value at which the torque of said dynamo-electric machine is maintained approximately constant.

9. The combination with a load, of a dynamo-electric machine provided with an armature, a shunt field winding and a series field winding and connected to operate as a cumulative compound motor to drive said load or as a differential compound generator to brake said load, means for controlling the excitation of said shunt field winding to maintain the driving and braking torques developed by said dynamo-electric machine approximately constant, said means comprising a motor operated rheostat and a torque relay for controlling the operation of said rheostat, said torque relay having relatively movable members, one of which carries a winding which is energized in proportion to the current traversing said armature and another of which carries windings which are energized in proportion to the current traversing said shunt and series field windings respectively, the windings carried by the second named member being arranged to act cumulatively with respect to each other during the motor operation of said dynamo-electric machine and to act differentially with respect to each other during the generator operation of said dynamo-electric machine, and means for varying the proportionality between the energization of the winding carried by the first named member and the current traversing said armature and thereby varying the value at which the torque of said dynamo-electric machine is maintained approximately constant.

In witness whereof, I have hereunto set my hand this 31st day of January 1918.

CLINTON J. AXTELL.